Figure 1:
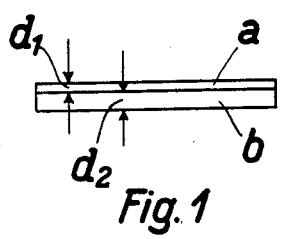

Sept. 12, 1933.      A. EHRINGHAUS      1,926,716
DOUBLE REFRACTION DEVICE
Filed Oct. 30, 1931

Inventor:
Arthur Ehringhaus

UNITED STATES PATENT OFFICE 1,926,716

DOUBLE REFRACTION DEVICE

Arthur Ehringhaus, Gottingen, Germany, assignor to the firm R. Winkel G. m. b. H., Gottingen, Germany Application October 30, 1931, Serial No. 572,087, and in Germany November 3, 1930

4 Claims. (Cl. 88—1)

An application has been filed in Germany, November 3, 1930.

According to A. Ehringhaus there is understood by relative dispersion of the double refraction of a plano-parallel plate of a doubly refracting medium the quotient of the double refraction for a light ray of a medial wave-length of the considered wave-length range and of the difference of the double refractions for light rays of wave-lengths at the limits of this wave-length range. The relative dispersion N of the double refraction of the visible light rays is therefore members, there exists the relation (1) $$N = \frac{\Delta_D}{\Delta_F - \Delta_C},$$

where $\Delta_D$ is the double refraction for the D-line and $\Delta_F$ and $\Delta_C$ are the double refractions for the F and C lines of the spectrum, respectively. The Formula 1 shows that N can assume any value between $+\infty$ and $-\infty$, and investigations have proved that, in fact, there exist crystals with a very great or a very small positive value as well as crystals with a very great or a very small negative value of the relative dispersion of the double refraction. However, in spite thereof, a crystal with the required relative dispersion of the double refraction adapted for the manufacture of optical devices is not always found, since, for instance the N values of the known media do not sufficiently approximate the desired N value or other optical as well as mechanical properties prevent the media from being worked into an optical precision device.

The invention, which aims at obviating this inconvenience, consists in a device of a doubly refracting medium for effecting a dispersion of the double refraction, which does not exist in nature or cannot be obtained for other reasons. This device is composed of at least two crystal members of the same kind of polarizing effect and of different relative dispersions of the double refraction, the said members having a constant ratio of thickness. If, for instance, the device is a plano-parallel plate, all single members must be plano-parallel plates; if this device is for instance a wedge, it may be composed of several wedges the edges of which are made to coincide. It is obvious that also lenses can be accordingly made up of single members. The resulting relative dispersion of the double refraction of the device depends on the choice of the single members and can be subsequently found by experiments. If the ratio of thickness is not constant, this resulting value is different in different zones of the device.

It is of importance that the resulting value of the relative dispersion of the double refraction of a doubly refracting device as above described can be determined also beforehand, which is effected by choosing suitable material and dimensions for the single members. Care has to be taken that for the relative dispersions $N_1$ and $N_2$ of the two members used for composing the device and for the resulting dispersion N of the double refraction of these two members holds good the equation (2) $$N = \frac{N_1 \cdot N_2 (\Gamma_1 \mp \Gamma_2)}{N_2 \cdot \Gamma_1 \mp N_1 \cdot \Gamma_2},$$

where $\Gamma_1$ and $\Gamma_2$ are the phase differences of the two members for a light ray of a medial wave-length of the considered wave-length range and consequently for the visible spectrum for instance the phase differences of a light ray having the wave-length of the D-line. The negative and positive signs of the equation hold good for the subtraction and the addition position, respectively, of the single members. If, for the sake of avoiding unfavourable ratios of size or for any other reasons, the device is composed of more than two single members, it is convenient to assume the device to be composed of two members at least one of which, in its turn, is composed of several single members. In this way it is possible to realize any N value of the device by using the material which, for optical or any other reasons, is to be given the preference.

The case in which the relative dispersion of the double refraction of the device is very, and at the utmost infinitely, great, is of special importance, since the phase difference for rays within the considered wave-length range is independent of the wave-length or, in other words, approximately constant. From Equation 2 there results for $N = \infty$ (3) $$N_2 \cdot \Gamma_1 \mp N_1 \cdot \Gamma_2 = 0$$

or (3a) $$\frac{N_1}{N_2} = \pm \frac{\Gamma_1}{\Gamma_2},$$

that is to say, the ratio of the phase differences of the two members of the device is for a light ray of medial wave-length of this range numerically equal to the ratio of the relative dispersions of the double refraction of these members. It is obvious that this special case of the constant phase difference can always be carried into effect by means of plano-parallel plates. However, giving the device the form of a wedge means that the phase difference is generally constant within a very narrow zone parallel to the edge of the wedge and that this phase difference varies in different zones on account of the different thicknesses of the traversed plate. If the single wedges of the device are so composed that their wedge edges coincide, the ratio of the phase differences of each two members is constant for a light ray of medial wave-length, which is due to the constant ratio of the thicknesses of the single wedges. The relative dispersion of the double refraction $N=\infty$ can therefore be realized also by means of a wedge-shaped device.

By relative dispersion of the rotation double refraction of a plano-parallel plate of optically rotating material is understood according to A. Ehringhaus and corresponding to Equation 1 also a quotient in which, however, there appears in the numerator the product of the specific rotation and the wave-length for a light ray of medial wave-length of the considered wave-length range and in the denominator the difference of the corresponding products for light rays of wave-lengths at the limits of this wave-length range. The relative dispersion R of the rotation double refraction of the visible light rays is therefore defined by the expression (4) $$R = \frac{\rho_D \cdot \lambda_D}{\rho_F \cdot \lambda_F - \rho_C \cdot \lambda_C},$$

where $\rho_D$ is the specific rotation capacity, $\lambda_D$ the wave-length for a light ray of the wave-length of the D-line, and where $\rho_F$, $\rho_C$, $\lambda_F$ and $\lambda_C$ are the corresponding values for the F and the C line of the spectrum. As in nature there apparently appear in crystals only restricted ranges of the values which, according to Equation 4, are possible for R, a device of a doubly refracting medium of a definite relative dispersion of the rotation double refraction is frequently made to consist of two or more members with a constant ratio of thickness. Between the relative dispersions $R_1$ and $R_2$ of the rotation double refraction of each two members used for composing the device and the resulting relative dispersion R of the rotation double refraction of these two members, there exists the relation (5) $$R = \frac{R_1 \cdot R_2 (d_1 \cdot \rho_1 \mp d_2 \cdot \rho_2)}{R_2 \cdot d_1 \cdot \rho_1 \mp R_1 \cdot d_2 \cdot \rho_2},$$

where $d_1$ and $d_2$ are the thicknesses of the two members, $\rho_1$ and $\rho_2$ the specific rotation capacities of the two members for a light ray of medial wave-length of the considered wave-length range. If the device consists of more than two members, also in this case at least one of the members is made to consist of several single members for which the value 5 also holds good. The negative and positive signs in the Equation 5 are again valid for the subtraction and the addition position, respectively, of the single members. When using devices of this kind for producing a definite relative dispersion of the rotation double refraction, the requirement of giving the rays of a great wave-length range an approximately constant path difference may be met by devices according to Equations 5 and 2. Not only plano-parallel plates, but also a wedge form may be taken into consideration when instead of a quartz wedge compensating device according to Soleil the invention is to be used for instance in technical saccharimeters. So-called single as well as double wedge compensating devices naturally can be constructed according to the invention, and the material for this construction not being restricted to natural crystals also artificial crystals may be used.

Figure 2:
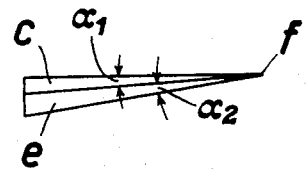
Figure 3:
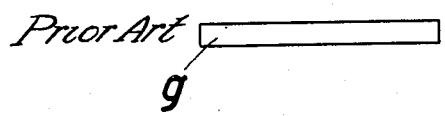
Figure 4:
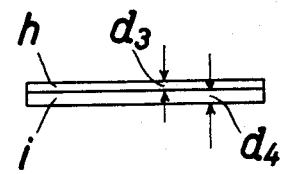
Figure 5:
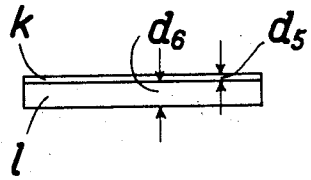

The accompanying drawing, which illustrates the invention, shows in cross sections four constructional examples of the device. Figure 1 represents the first example, a plate, and Figure 2 a second example, a wedge for which are indicated the dimensions for a selection of different values of the relative dispersion of the double refraction. Figure 3 shows for comparison the well-known quartz plate according to Laurent. Figure 4 represents a third example, a plate composed of two members in which the relative dispersion of the double refraction is very great and the phase difference for a light ray consequently approximately constant, and, finally, Figure 5 shows a fourth example, a plate for which are given the dimensions for a selection of different values of the relative dispersion of the rotation double refraction.

The first example (Figure 1) shows a plano-parallel plate composed of two plates $a$ and $b$ which are also plano-parallel. The plate $a$ is of quartz, the plate $b$ of calcium dithionate, and both plates are cut parallel to the optical crystal axes. The plates $a$ and $b$ are coordinated to each other in subtraction position. In Table 1 the values N of the resulting relative dispersion of the double refraction of the composed plate in the visible part of the spectrum are given for a plurality of different thicknesses $d_2$ of the plate $b$, where the plate $a$ has always the same thickness $d_1 = 1$ millimeter.

Table 1

| N | $d_2$ (millimeters) |
|---|---|
| −7 | 0.5012 |
| −3 | 0.5888 |
| −2.13 | 0.6492 |
| −2 | 0.6595 |
| −1.86 | 0.6711 |
| +0.26 | 0.9395 |
| +0.51 | 0.9894 |
| +0.69 | 1.0294 |
| +2 | 1.4866 |

The example shows the way in which, by using a plurality of different media, for instance quartz of the relative dispersion $N_1 = 33.67$ of the double refraction and calcium dithionate of the relative dispersion $N_2 = 4.6$ of the double refraction, very different values N of the relative dispersion of the double refraction, especially such values which do not naturally appear in optically useful crystals, can be realized simply by altering the thicknesses of the single plates.

The wedge angles $\alpha_2$ of the wedge $e$, which correspond to the values N of the relative dispersion of the double refraction according to the first example, are given in Table 2 as a second example (Figure 2) for a wedge consisting of a single wedge $c$ of quartz and a single wedge $e$ of calcium dithionate, and it is asumed that the quartz wedge $c$ has an invariable wedge angle $\alpha_1 = 6°\ 25'$. Also in this case the two single wedges $c$ and $e$ are cut parallel to the crystal axes and so composed that they are in subtraction position, where their edges coincide on one common edge. Working an accurate edge being rather difficult with the resulting small wedge angles, that part of the wedges $c$ and $e$ which is next to the edge $f$ can be dispensed with.

Table 2

| N | $\alpha_2$ |
|---|---|
| −7 | 3°14′ |
| −3 | 3°47′ |
| −2.13 | 4°11′ |
| −2 | 4°15′ |
| −1.86 | 4°19′ |
| +0.26 | 6° 2′ |
| +0.51 | 6°21′ |
| +0.69 | 6°36′ |
| +2 | 9°30′ |

A Laurent quartz plate for half-shade apparatus is generally given such a thickness that the resulting phase difference $\Gamma$ for a light ray of a definite wave-length $\lambda$ is an odd multiple of half the wave-length. That is to say, for the phase difference $\Gamma$ holds good the relation (6) $$\Gamma = (2m+1)\frac{\lambda}{2},$$

where $m$ may be any whole positive number. With the Laurent quartz plate $g$ shown in Figure 3 for comparison purposes and being cut parallel to the crystal axis, the thickness is 1.3584 millimeters which corresponds to $m=20$ when assuming the wave-length corresponding to the sodium line D to be $\lambda_D=0.0005893$ millimeter. With this plate the phase difference $\Gamma$ for light of the wave-length of the B line is 0.0122069 millimeter, of the C line 0.0122503 millimeter, of the D line 0.0123753 millimeter, of the E line 0.0125132 millimeter, of the F line 0.0126171 millimeter, and of the G line 0.0128100 millimeter. Therefore, in the spectrum range lying between the C and the F line the alteration of the phase difference $\Gamma$ amounts to approximately 3% and in the range between the B and the G line to approximately 5% of the smallest value. This dependence of the phase difference $\Gamma$ on the wave-length is the reason why the rotation capacity of the medium is only inaccurately determined even when using purified sodium light as a light source. According to Lippich the error amounts to approximately 0.2%.

The third example of the invention (Figure 4), which may be used instead of the above described quartz plate, consists of a plano-parallel plate composed of a single plate $h$ of calcite and a single plate $i$ of quartz. The single plates $h$ and $i$ are cut parallel to the crystal axes and composed in subtraction position. The relative dispersion of the double refraction of the calcite plate $h$ amounts to $N_1=23.68$, that of the quartz plate $i$ to $N_2=33.67$. The thicknesses of the two plates amount to $d_3=0.16651$ millimeter and to $d_4=4.46941$ millimeters. In the following Table 3 the phase differences $\Gamma_1$ and $\Gamma_2$ of the single plates and the resulting phase difference $\Gamma=\Gamma_2-\Gamma_1$ for the compound plate for the light of the different spectral lines are given in millimeters.

Table 3

|   | $\Gamma_1$ | $\Gamma_2$ | $\Gamma$ |
|---|---|---|---|
| B | 0.0281494 | 0.0401621 | 0.0120127 |
| C | 0.0282793 | 0.0403051 | 0.0120258 |
| D | 0.0286356 | 0.0407163 | 0.0120807 |
| E | 0.0290786 | 0.0411700 | 0.0120914 |
| F | 0.0294882 | 0.0415119 | 0.0120237 |
| G | 0.0302291 | 0.0421465 | 0.0119174 |

According to Equation 2 there follows from the example a resulting relative dispersion N of the double refraction, which has the value $N=5753$, that is to say a value which is practically infinite. Within the range between the C line and the F line the resulting phase difference $\Gamma$ is constant with an accuracy of approximately 0.5% and within the greater range between the B line and the G line with an accuracy of 0.9% of the smallest value. Assuming $m$ to be 20, the thicknesses $d_3$ and $d_4$ of the example are determined by means of the phase differences $\Gamma_1$ and $\Gamma_2$ valculated by means of the Equations 3a and 6.

The plate according to the fourth example (Figure 5) is composed of two plano-parallel single plates $k$ and $l$. The plate $k$ is of quartz and is cut perpendicularly to the crystal axis, and the plate $l$ is of sodium chlorate. The single plates are composed in subtraction position and consequently have opposite rotation capacities the specific value of which, referring to the D line, amounts to $\rho D_1=21.69°$ for the quartz plate $k$ and to $\rho D_2=2.12°$ for the sodium chlorate plate $l$. The relative dispersion of the rotation double refraction for the quartz plate $k$ has been determined according to Equation 4 as $R_1=2.81$ and for the sodium chlorate plate $l$ as $R_2-2.97$. In Table 4 are contained for the different values R of the resulting relative dispersion of the rotation double refraction according to Equation 5 the thicknesses $d_4$ of the single plate $l$ in millimeters, and the specific values $\rho_C$, $\rho_D$, $\rho_F$ of the rotation capacity of the whole plate for light of the wave-length of the spectral lines C, D and F. The thickness of the quartz plate $k$ amounts in all cases to $d_5=1$ millimeter.

Table 4

| R | $d_4$ (mm.) | $\rho_C$ | $\rho_D$ | $\rho_F$ |
|---|---|---|---|---|
| ∞ | 7.255 | 0.997° | 1.22° | 1.34° |
| 8.18 | 7.484 | 1.57° | 1.94° | 2.42° |
| 1.58 | 8.088 | 3.10° | −1.40° | 5.26° |
| 1.36 | 6.543 | 0.805° | 1.04° | 2.09° |
| 0.17 | 6.845 | 0.033° | 0.075° | 0.571° |

I claim:

1. A double refraction device for effecting a relative dispersion of the double refraction which is not naturally obtained with a single optically useful crystal, the device being composed of two crystal members of the same kind of polarising effect and of different relative dispersions of the double refraction, the said members having a constant ratio of thickness.

2. A double refraction device for effecting a relative dispersion of the double refraction which is not naturally obtained with a single optically useful crystal, the device being composed of two crystal members of the same kind of polarising effect and of different relative dispersions of the double refraction, the said members having a constant ratio of thickness, and for the relative dispersions $N_1$ and $N_2$ of the double refraction of the two members and for the resulting relative dispersion N of the double refraction of these two members holding good the relation $$N = \frac{N_1 \cdot N_2 (\Gamma_1 \mp \Gamma_2)}{N_2 \cdot \Gamma_1 \mp N_1 \cdot \Gamma_2},$$

where $\Gamma_1$ and $\Gamma_2$ are the phase differences of the two members for a light ray of medial wave-length.

3. In a device according to claim 2, the ratio of the phase differences of the two members for a light ray of medial wave-length being numerically equal to the ratio of the relative dispersions of the double refraction of the said members.

4. In a device according to claim 1, for the relative dispersions $R_1$ and $R_2$ of the rotation double refraction of the two members and for the resulting relative dispersion R of the rotation double refraction of these two members holding good the relation $$R = \frac{R_1 \cdot R_2 (d_1 \cdot \rho_1 \mp d_2 \cdot \rho_2)}{R_2 \cdot d_1 \cdot \rho_1 \mp R_1 \cdot d_2 \cdot \rho_2},$$

where $d_1$ and $d_2$ are the thicknesses and $\rho_1$ and $\rho_2$ the specific rotation capacities of the two members for a light ray of a medial wave-length.

ARTHUR EHRINGHAUS.